(12) United States Patent
Burch et al.

(10) Patent No.: US 10,455,025 B2
(45) Date of Patent: Oct. 22, 2019

(54) MULTI-FACTOR AUTHENTICATION

(71) Applicant: Micro Focus Software Inc., Wilmington, DE (US)

(72) Inventors: Lloyd Leon Burch, Payson, UT (US); Gulshan Govind Vaswani, Bangalore (IN); Sureshkumar Thangavel, Bangalore (IN); Rik Peters, Etten-Leur (NL)

(73) Assignee: Micro Focus Software Inc., Wilmington, DE (US)

( * ) Notice: Subject to any disclaimer, the term of this patent is extended or adjusted under 35 U.S.C. 154(b) by 327 days.

(21) Appl. No.: 15/226,499

(22) Filed: Aug. 2, 2016

(65) Prior Publication Data

US 2018/0041510 A1 Feb. 8, 2018

(51) Int. Cl.
*H04L 29/06* (2006.01)
*H04L 29/08* (2006.01)

(52) U.S. Cl.
CPC .............. *H04L 67/14* (2013.01); *H04L 63/08* (2013.01); *H04L 63/18* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 6,212,635 B1* | 4/2001 | Reardon | ................. | G06F 21/34 380/30 |
| 8,925,053 B1* | 12/2014 | Mehta | ..................... | G06F 21/31 713/155 |
| 9,386,007 B2* | 7/2016 | Minov | ................. | H04L 63/0815 |
| 9,462,080 B2* | 10/2016 | Lesage | .................... | H04L 67/34 |
| 9,948,610 B2* | 4/2018 | Broadbent | .......... | H04L 63/0281 |
| 9,990,628 B2* | 6/2018 | Giobbi | ..................... | G06F 21/31 |
| 10,015,171 B1* | 7/2018 | Vardy | ................... | H04L 63/102 |
| 2009/0165125 A1* | 6/2009 | Brown | ..................... | G06F 21/31 726/21 |
| 2013/0111543 A1* | 5/2013 | Brown | ................ | H04L 63/0884 726/1 |
| 2014/0282938 A1* | 9/2014 | Moisa | .................. | G06F 21/6218 726/6 |
| 2014/0300923 A1* | 10/2014 | Sarangamath | ........ | G06F 3/1206 358/1.14 |
| 2016/0198287 A1* | 7/2016 | Hulusi | ................ | H04M 1/0291 455/41.1 |
| 2017/0070498 A1* | 3/2017 | Fork | ....................... | G06F 21/33 |

* cited by examiner

*Primary Examiner* — Michael R Vaughan
(74) *Attorney, Agent, or Firm* — Schwegman Lundberg & Woessner, P.A.

(57) ABSTRACT

An authenticated session with a remote system is established and identified through an authentication token for the session. During that session, a resource is accessed requiring additional authentication beyond what the authentication token was originally authorized for. Out-of-band processing from the existing session performs the additional authentication and permission from the authentication token are upgraded to include permissions for accessing the resource during the session. The resource is accessed during the session with the authentication token having the upgraded permissions.

19 Claims, 7 Drawing Sheets

MULTI-FACTOR AUTHENTICATION

BACKGROUND

Network and computer security are of paramount concern in the industry today. It seems as if a week does not go by without some news about a network system being compromised. Moreover, this is not just private industry as governmental agencies experience security breaches with as much frequency as the private sector.

Multi-Factor authentication entails using two or more factors during authentication to enhance security. For example, a user may authenticate to a network-based service through a user-identification and password combination as a first factor of authentication. In a second factor of authentication, the user may be asked to enter a response to a challenge question. Typically, the user is authenticated for the first and second factors before a session with the network-based service is established. That is, the multiple factors are processed during session creation.

However, there are situations where the factors following session creation (using a first factor) occur at some point in time after a valid authentication session between the user and a system are established (additional authentication factors are instituted during the authenticated session established by a first factor authentication). For example, a user logs into the system using an identification and password combination to establish an authenticated session with the system (first factor); next, and during the authenticated session, the user attempts to access a service of the system that necessitates additional authentication by the user (using a second factor of authentication). Typically, in a browser-based interface, the second factor of authentication is handled using the authenticated session within the browser to prompt the user to supply the second factor authentication for access to the service requiring the second factor authentication.

However, there are a number of situations where the user's browser being used in the authenticated browser-based session cannot support performing a second authentication during the session. There are also situations where the content that is needed to be supplied by the user for the second factor during the authenticated browser-based session cannot be provided on the device that the user is operating during the authenticated session (such as a fingerprint (content for the second factor) when there is no fingerprint device or mechanism on the device that the user is operating during the authenticated session). It may also be that the user is remoting into a different device from which the authenticated session was originally established, and that different device has no ability to provide the interface screens for providing the content of the second factor or has no device for obtaining the content.

As still another example, consider a Representational State Transfer (REST) interface within a browser-based interface, a single Graphical User Interface (GUI) provides a single user interface within a browser for accessing a variety of external services using a third-party authentication provider for authentication to these resources. The authentication provider may receive a second factor request from an external service and have no mechanism to identify the authenticated session that the authentication provider has to request the second factor from and no mechanism for linking into that original authenticated session. When this occurs, an error is returned to the requester of the second factor and the user has no ability to authenticate to the desired service during the user's authenticated session.

In short, services that users access are now spread across clouds with no regard to any geographical, software, and/or device component limitations such that when multi-factor authentication is required existing user environments are incapable of seamlessly obtaining content relevant to the multi-factor authentication.

SUMMARY

Various embodiments of the invention provide techniques for multi-factor authentication. In an embodiment, a method for multi-factor authentication is presented.

Specifically, in an embodiment, a token is issued for a session between a principal and a service. Next, a request is received from the service to validate the token for access to a resource of the service during the session. An out-of-band communication is established with a principal service, and a credential that is provided over the out-of-band communication from the principal service is verified. Finally, permissions associated with the token are upgraded for authorizing the principal to access the resource during the session are upgraded.

DETAILED DESCRIPTION

Figure 1A:
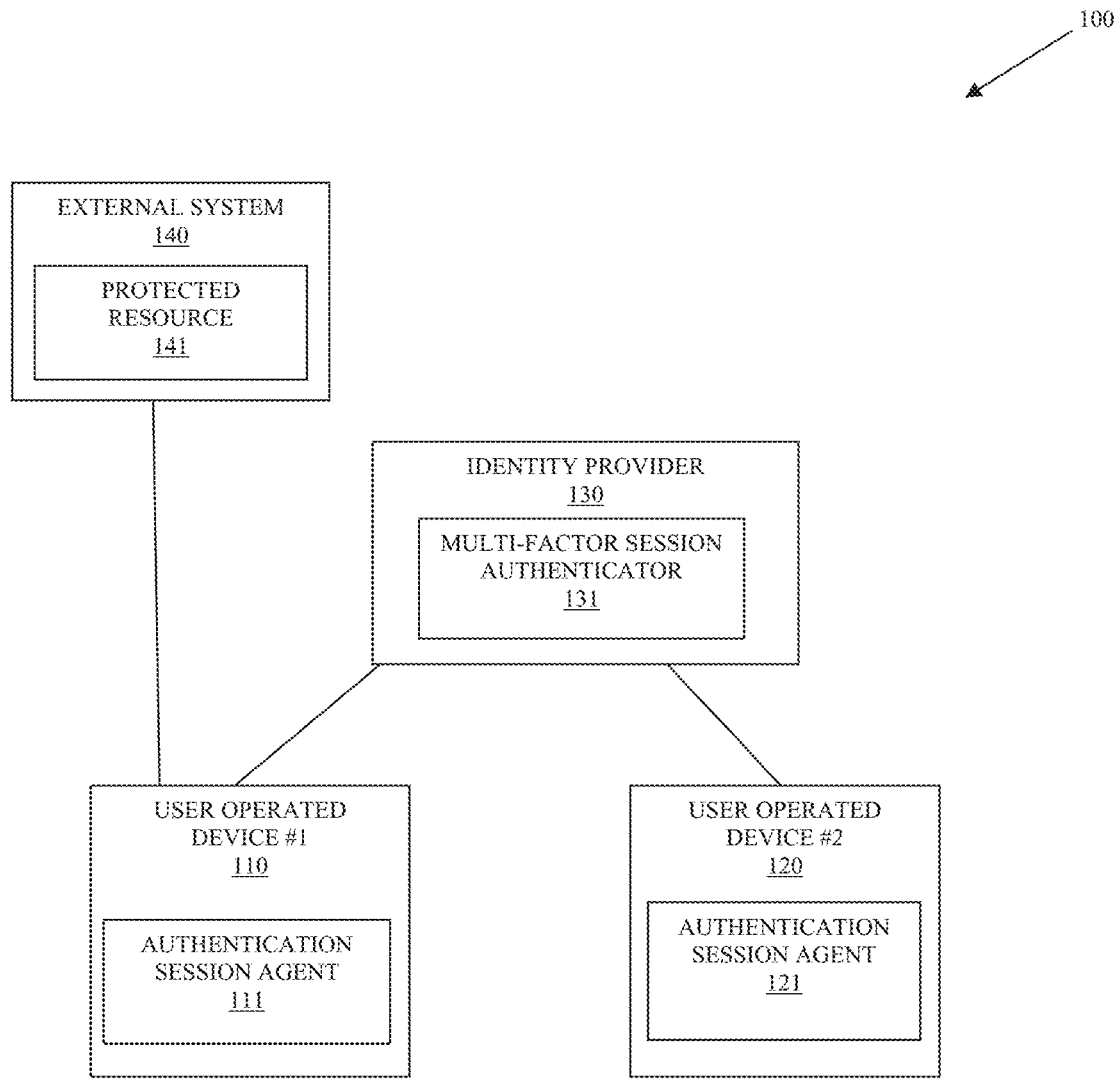
FIG. 1A is a diagram depicting an example architectural processing environment for practicing multi-factor authentication, according an example embodiment.

A "resource" includes: a user, service, system, a hardware device, a virtual device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, Media Access Control (MAC) address, Internet Protocol (IP) address, device serial number, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment. Moreover, a processing environment can be layered on top of a hardware set of resources (hardware processors, storage, memory, etc.) as a Virtual Machine (VM) or a virtual processing environment.

The phrases "processing environment," "cloud processing environment," "hardware processing environment," and the terms "cloud" and "VM" may be used interchangeably and synonymously herein.

Moreover, it is noted that a "cloud" refers to a logical and/or physical processing environment as discussed above.

A "service" as used herein is an application or software module that is implemented in a non-transitory computer-readable storage medium or in hardware memory as executable instructions that are executed by one or more hardware processors within one or more different processing environments. The executable instructions programmed in memory when executed by the hardware processors. A "service" can also be a collection of cooperating sub-services, such collection referred to as a "system."

A single service can execute as multiple different instances of a same service over a network.

Various embodiments of this invention can be implemented as enhancements within existing network architectures and network-enabled devices.

Also, any software presented herein is implemented in (and reside within) hardware machines, such as hardware processor(s) or hardware processor-enabled devices (having hardware processors). These machines are configured and programmed to specifically perform the processing of the methods and system presented herein, Moreover, the methods and system are implemented and reside within a non-transitory computer-readable storage media or memory as executable instructions that are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1A-1C and 2-4.

FIG. 1A is a diagram depicting an example architectural processing environment 100 for practicing multi-factor authentication, according an example embodiment. It is noted that the architectural processing environment 100 is presented as an illustrated embodiment and that other component definitions are envisioned without departing from the embodiments discussed herein. It is also to be noted that only those components necessary for comprehending the embodiments are presented, such that more or less components may be used without departing from the teachings presented herein.

The architectural processing environment 100 includes: a user-operated device #1 110, an optional user-operated device #2, an identity provider 140, and one or more external systems 140.

The user-operated device # 1 110 and #2 120 include an authentication session agent 111 and 121, respectively. The identity provider 130 includes a multi-factor session authenticator 131. The external system 140 includes at least one protected resource 141 for which additional factor authentication is needed to access that protected resource 141.

Various techniques for practicing the multi-factor authentication, according to various embodiments of the invention, are now discussed for operational situations of the environment 100 with reference to the components of the FIG. 1.

A principal (automated application or user) initially authenticates for access to the external system 140 through the user-operated device #1 110 using the identity provider 130. The principal uses a browser to access external system 140. External system 140 redirects the browser to the IDP 140 for authentication of the principal. Authentication can be achieved through any required authentication mechanism using a single factor or multi-factor authentication approach (based on what is initially required by the external system 140 for authenticating the principal for access in an authenticated session with the external system 140. The IDP 130 handles authentication of the principal on behalf of the external system 140. The identity provider 130 returns an authentication token back to the browser of the user-operated device #1 110.

Conventionally, at this point in time, the browser would be redirected back to the external system 140 with the authentication token. The external system 140 then validates the authentication token with the IDP 140 and permits an authenticated session with the principal (through the browser).

The browser (through an embedded plugin, through instructions from the identity provider 130 (IDP 130), and/or through a native application executing and monitoring principal activity on the user-operated device #1 110), causes (directly or indirectly) an authentication session agent 111 to be instantiated on the user-operated #1 device. When initiated, the authentication session agent 111 obtains a session key or identifier for the principal's authenticated session with the external system 140 and creates a Uniform Resource Locator (URL) (or other-type of hook) for the IDP 130 to access information messages of the authentication session agent 111 and/or to communicate with the authentication session agent 111, The authentication session agent 111 provides the URL back to the IDP 130. The IDP 130 links the authentication token (originally provided to the browser of the principal when the principal first authenticated through the IDP 130 for an authenticated session with the external system 140) with the URL and session key/identifier provided by the authentication session agent 111.

The communication between the authentication session agent 111 and the IDP 130 is achieved out-of-band with the authenticated session (over a communication channel that is not the communication channel used for the authenticated session between the principal (through the browser) and the external system 140. This out-of-band communication is done without any knowledge or without any software/processing changes being required or made to the interfaces associated with the external system 140. Moreover, this out-of-band communication is achieved without any browser-based redirection being required of the principal's browser processing on the user-operated #1 device 110. Still further, this out-of-band communication occurs without any action being required by the principal.

The IDP 130 can operated in the authentication session agent 111 in two modes: a push mode for which the IDP 130 pings the authentication session agent 111 to take some action or information (for processing multi-factor authentication) and/or a pull mode of operation in which the authentication session agent 111 independent takes action and reports information back to the IDP 130.

After the above-initial configuration of the environment 100 is established through the processing described above and the principal has an authenticated session between the user-operated device #1 110 and the external system 140, the principal attempts to access a protected resource 141 controlled by the external system 140, which the existing authentication token for the authenticated session is not permitted to access (the token lacks access rights or permission for accessing).

When this occurs (for a push mode of operation of the authentication session agent 111), the external system contacts the IDP 130 with the authentication token with a request to provide authentication of the existing authentication token associated with the session for accessing the protected resource 141. Conventionally, when the principal's browser lacks support, or the user-operated device lacks support, such that the IDP 140 is unable to obtain an additional factor for providing the browser a new authentication token, the IDP 130 would return a failed authentication to the external system 130. This situation is changed with the beneficial teachings presented herein. The IDP 130 already has the link for communicating with the authentication session agent 111 and the association the link to the existing authentication token for the authenticated session (as discussed above). Accordingly, the IDP 130 pushes a notification to the authentication session agent 111, in response to the notification, the authentication session agent 111 presents a separate window (or popup window and separate from the authenticated session) within the browser or within a display of the user-operated device #1. The window requests the additional factor authentication from the principal (e.g., a fingerprint, Personal Identification Number (PIN), an answer to a challenge question, a retinal scan, a key from a Universal Serial Bus (USB) storage device interfaced to the user-operated device #1, etc.). Once the principal supplies the additional factor (can be also multiple factors), the additional factor is sent from the authenticated session manager 111 to the IDP 130. The IDP 130 authenticates the additional factor and assuming authentication is successful, the IDP 130 does not change the original authentication token but; rather, updates permissions of the existing authentication token that grants the principal access to the protected resource 141 of the external system 140. The IDP 130 then responds to the external system 140 indicating that the authentication token is permitted to access the protected resource 141 (this is done with the existing authentication token that did not have original access to the protected resource 141). The principal can then continue in the existing authentication session with access to the protected resource 141.

During a second mode of operation (pull mode), the authentication session agent 111 regularly polls the IDP 130 to see when the IDP 130 has received a request to authenticate the principal for purposes of the principal gaining access to the protected resource 141. The interval with which the authentication session agent 111 polls the IDP 130 can be a configured processing parameter of the authentication session agent 111. When the IDP 130 has a request to authenticate the principal for access to the protected resource, the IDP informs the authentication session agent 111 to perform actions on the user-operated device #1 110 for obtaining from the principal one or more additional factors in manners similar to what was discussed above for the pull mode of operation of the authentication session agent 111.

In an embodiment, the user-operated device #1 may lack an ability to obtain a required additional factor from the principal. In such a case, the principal may have previously registered a second user-operated device #2 120. Here, when the IDP 130 instructs the authentication session agent 111 to obtain the additional factor, the authentication session agent 111 reports its inability or an error condition back to the IDP 130. The IDP 130 then checks a principal identity assigned to the authentication token and discovers the second user-operated device #2 120 (as a previously registered device to the principal. A push notification is sent from the IDP 130 to the second user-operated device #2 120 to wake up or initiate the authenticated session agent 121 and the authenticated session token is supplied along with a request from the IDP 130 to obtain the additional factor. The authenticated session agent 121 then obtains the additional factor in manners similar to what the authenticated session agent 111 used in scenarios where the authenticated session agent 111 was able to obtain the additional factor (as discussed above). The IDP 130 then authenticates the additional factor and assuming successful authentication is achieved on the additional factor, the IDP 130 updates the permissions of the existing authentication token to permit the principal to access the protected resource 141 from the user-operated device #1 110 via the existing authenticated session that the principal has with the external system 140.

It is noted that the additional factor can include any number of additional authentication-based factors as including, but not limited to: device proximity-based authentication (for example user-operated device #2 120 has to be physically located within a configured physical distance of user-operated device #1 110), biometric factors, key possession located on user-operated device #1 110, #2 120, on an independent portable device interfaced to device #1 110 or device #2 120, and other factors.

The authentication session agent 111 (and/or 121) when combined with the processing of the IDP 130 provides a back channel and out-of-band communication mechanism for dynamically upgrading an existing single-factor authentication token for an ongoing authentication session to permit that same authentication token to provide authentication to resources requiring additional (multi-factor) authentication. This is done: 1) without redirection back to the principal's browser, without any changes to the existing system 140, 2) without requiring any changes to the browser interface associated with the existing authentication session between the principal and the existing system 140, 3) without any processing occurring on or within the existing authentication session when achieving the additional factor authentication for the existing authentication session, 4) without providing a new authentication token for the existing authentication session, and 5) without requiring principal action from the existing browser session interfaces.

Some example embodiments of multi-factor authentication are now discussed with reference to the FIGS. 1B-1D.

Figure 1B:
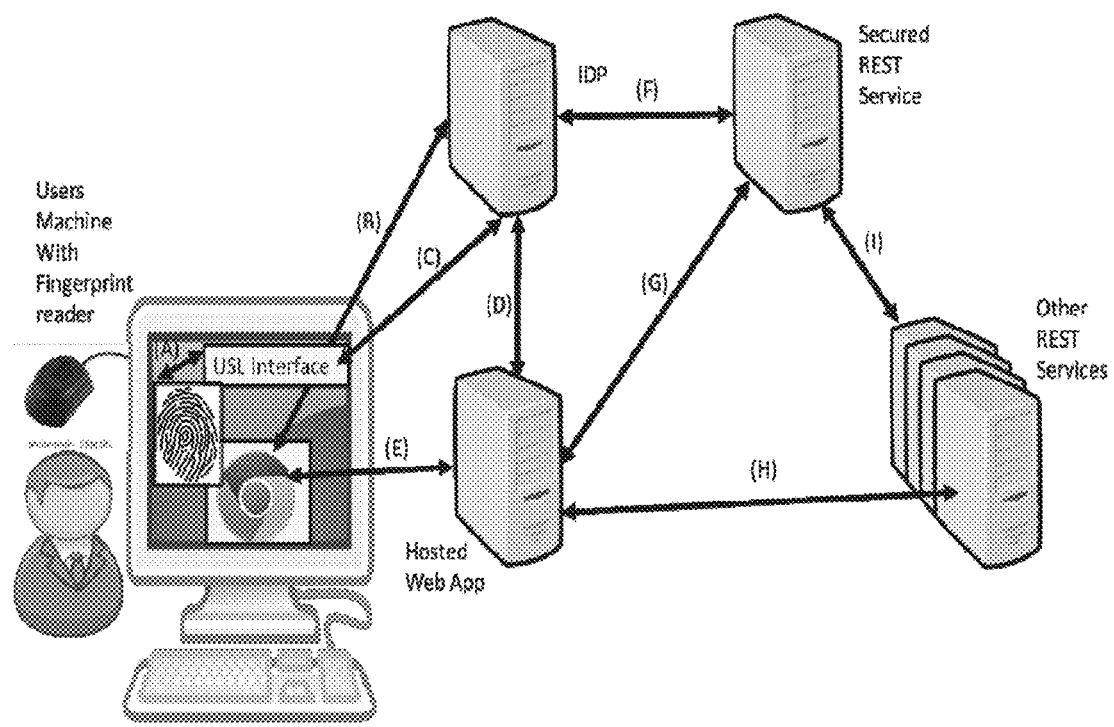
FIG. 1B is a diagram depicting multi-factor authentication with Representational State Transfer (REST) interfaces, according to an example embodiment.

FIG. 1B is a diagram depicting multi-factor authentication with Representational State Transfer (REST) interfaces, according to an example embodiment.

The processing begins with the user (one type of principal) navigating to a hosted web application (app, such as external system 140) with the browser (E). The web app then redirects the user's browser to the IDP (such as IDP 130 of the FIG. 1A) for authentication with a Name/Password combination (B) (first factor authentication. It is noted that this can be achieved using existing OAuth (open protocol for authentication); however, it is also to be noted that other protocols or token types could also be used, without departing from the beneficial teachings presented herein.

After the user authenticates to the IDP with the credentials as part of the reply to the browser, a new User Session Link (USL) window is opened. Java Script or other HTML code can be used to open the window. In an embodiment, the USL is the authentication session agent 111 (and/or 121) discussed above in the FIG. 1A. This window can be a new browser window, a browser plugin or a native application that was preinstalled on the desktop device (such as user-operated device #1 110 of the FIG. 1A). The USL window may be visible on the main screen or may be minimized as an icon on the task bar of an Operating System (OS) for the desktop device.

When the USL window is open, the USL gets a session key and a URL to check for messages. The key and URL are used to register the USL window with the IDP (C). This registration can be setup to poll the IDP or to set hold a connection with the IDP. The USL may poll (pull mode as discussed above) or it may wait for any authentication messages to be sent from the IDP (push mode as discussed above).

The OAuth token (or any type of token) that is built to be sent back to the hosted web application is linked to the USL key. This link may be included in the token or linked via a reference that ties the user session and the USL key.

The OAuth Token is sent to hosted web application (E), which is then validated (D). As the hosted web application makes REST calls to the secured REST service, the OAuth token is passed as part of the call. The secure REST service validates the token by sending it to the IDP (F). Again, other protocols or token types besides OAuth can also be used.

When the IDP receives the token to be validated it checks policy to see if other forms of authentication are needed. In this example a finger print is also needed as a result of the users RISK score at some point during the authenticated session or as a result of the user accessing a protected resource (such as protected resource 141 of the FIG. 1A) during the authenticated session. Conventionally, without the teachings presented herein, an error code/message would be returned in this situation, but this is changed herein. The IDP identifies the association of the token with the USL and uses the USL for contacting the desktop machine that the user first authenticated from and has the authenticated session with the hosted web app on. The IDP requests a "Step Up Authentication" action by sending a message to the USL interface window running on the user's desktop (C). The USL opens a display to the user and activates the finger print reader of the desktop machine. The user then inputs their finger print. The USL now sends a message to the IDP with the finger print data (additional factor as discussed above with the FIG. 1A). If the finger print data is validated, the IDP records that a valid finger print has been noted and the IDP validates the OAuth request for access to the protected resource or updates the RISK score for the user during the session. The authentication token is not changed rather, the permissions associated with authentication token are upgraded (such that no new authentication token need be provided to the users browser for continuing with the authenticated session).

The OAuth token can now be processed/used (during the ongoing and existing authenticated session) to: read, write or modify; as any standard OAuth token (F) would be. The OAuth token can also be sent to other REST Services from the Secured REST Service or from the hosted web app just as any standard OAuth token. If additional authentication is desired or required during the remainder of the authenticated session, such processing can happen at any time an OAuth token is set to the IDP for validation or any action.

Figure 1C:
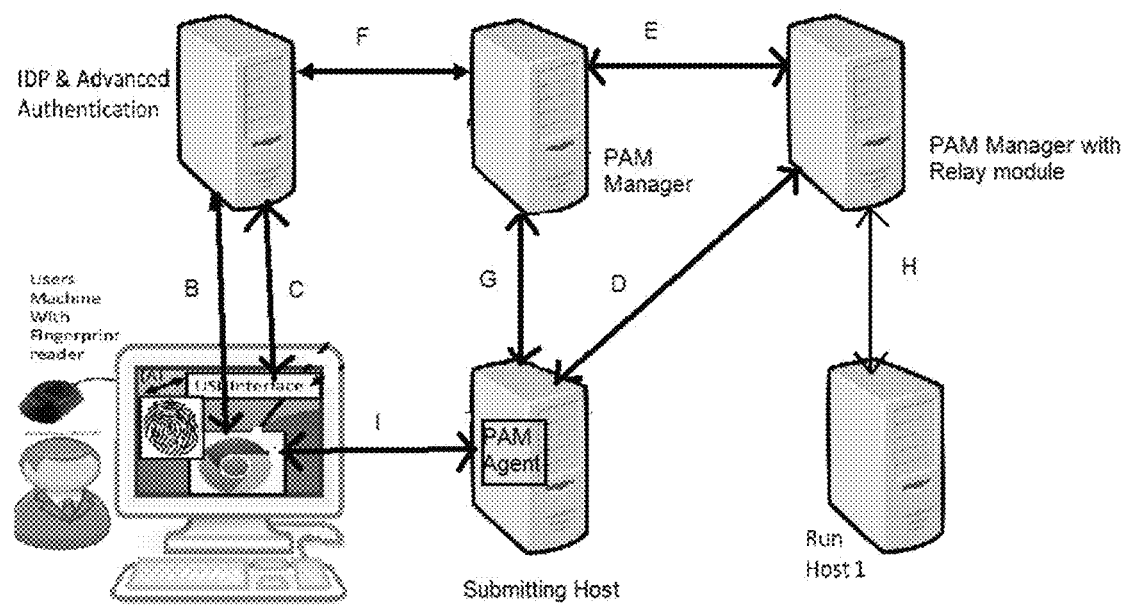
FIG. 1C is a diagram depicting multi-factor authentication with remoting, according to an example embodiment.

FIG. 1C is a diagram depicting multi-factor authentication with remoting, according to an example embodiment.

Some products available use a remoting process for authentication. For example, the Privileged Account Manager® (PAM) distributed by NETIQ, Inc. allows normal users to have access to privilege services. This is done via a PAM Manager that remotely provides administrative credentials to uses as needed for administrative access.

The process begins by a user doing a Secure Shell (SSH) session to a submit host. This is a normal SSH connection. The run host and submit host are behind a same firewall and user has direct access only to submit host. In addition, the user does not know the credentials of the run host server. The user initiates a SSH session to run host from submit host by relaying the connection through a relay module installed in the PAM manager, For this example, the PAM manager with relay module is installed in a dedicated host. The PAM manager with relay module sends the authentication request for the user to the PAM Manager (E). In this example, a name and password is used for the first authentication factor. The PAM manager validates the user by sending the credentials to the IDP (F) (such as IDP 130 of the FIG. 1A), this authentication can also be done via a browser (B).

The IDP builds a USL (as discussed above and such as the authentication session agent 111 (albeit installed on a device other than the user-operated device, in this embodiment)) and returns the USL with a valid token to the PAM manager (F). The PAM Manager stores the USL and links it to the PAM token. The PAM manager detects that the authentication needs to be upgraded to include a "Finger Print" authentication (a second factor for multi-factor authentication). The PAM Manager requests a step up authentication action using the IDP and advanced authentication (C), The authentication session agent 111 or a browser connection is called (A or B) to prompt the user with a request to read his finger print. If the finger print is valid the PAM Manager is authorized to allow the token to be used (F).

The PAM Manager with relay module (manager) injects the credentials needed to connect to the run host server (target server) in the SSH connection to run host (H) using Single-Sign On (SSO). The user is now allowed access with the upgraded authentication, There is another process flow where a user is allowed to execute a privileged command on submit host server. The processing begins by the user doing an SSH session to the submit host. This is a normal SSH connection. The user does not know the root credentials of the submit host server. For this example, the PAM agent is installed in the submit host. The user executes a privileged command by redirecting the command through PAM agent. The PAM agent authorizes the user's command access at the PAM Manager (G).

Next, the PAM manager detects that the authorization needs to be upgraded to include a "Finger Print" authentication (second factor in multi-factor authentication), The IDP builds a USL and returns it with a valid token to the PA M manager (F). The PAM Manager stores the USL and links it to the PAM token. The PAM Manager requests step up authentication using the IDP and Advanced authentication (C) The authentication session agent 111 or browser connection is called (A or B) to prompt the user with a request to read his finger print. If the finger print is valid the PAM Manager is authorized to allow the token to be used (F).

The PAM Manager now indicates to the PAM agent that the user is authorized and the PAM agent elevates the user to root on submit host to execute the privileged command. The user is now allowed access with the upgraded authentication.

Figure 1D:
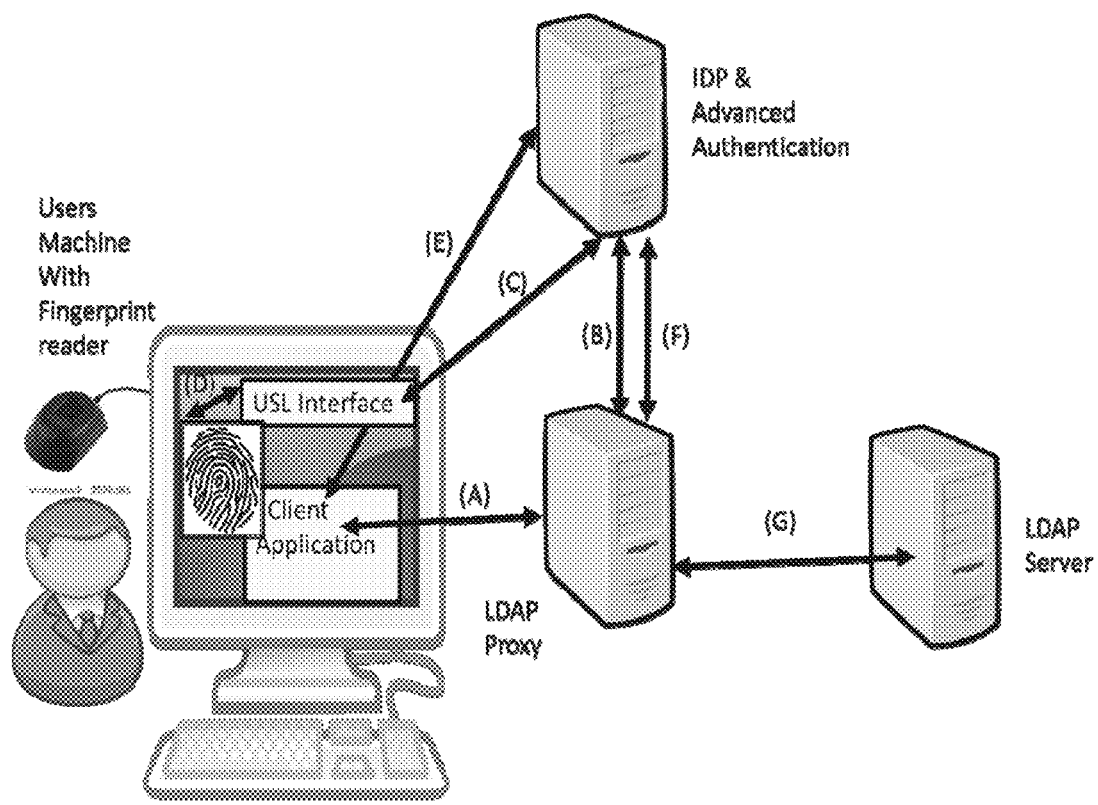
FIG. 1D is a diagram depicting multi-factor authentication with Lightweight Directory Access Protocol (LDAP), according to an example embodiment.

FIG. 1D is a diagram depicting multi-factor authentication with Lightweight Directory Access Protocol (LDAP), according to an example embodiment.

In this Example the user has already established a USL (caused to be instantiated an authentication session agent 111) with the IDP (such as IDP 130 of the FIG. 1A) and the advanced authentication mechanism. The description that follows describes what happens when the LDAP Proxy is configured to use strong authentication when processing a LDAP request.

Conventionally, the LDAP protocol only allows for text based/single factor authentication. The LDAP protocol doesn't allow for a challenge to be sent to a user or to have a multi-step authentication n process. In this example a LDAP proxy is in between the client application and the LDAP repository, When the client application initiates the LDAP request using a username and password this is intercepted by the LDAP proxy (A). This proxy then connects to the IDP and the advanced authentication mechanism (B), which connects to the USL (C) and starts a browser or agent application on the user machine requesting finger print authentication (D) (second factor for multi-factor authentication). The user presents his/her finger print and the fingerprint data is sent through the USL to the IDP and the advanced authentication mechanism (E), After successfully validation, the IDP and the advanced authentication mechanism approve the LDAP Proxy (F) to continue authentication to the LDAP server (G).

It should now be apparent with the above-described embodiments, that embodiments presented herein will allow multi-factor authentication to be set up, initiated, and processed even when there is no browser connection allowed. Moreover, the embodiments permit an authenticated user to achieve an out-of-band second factor authentication during a single factor authenticated session. Still further, embodiments permit push notifications to be sent to a desktop much the same as a mobile device's are equipped with push notification processing. Furthermore, embodiments permit non-browser advanced authentication (multi-factor authentication).

Figure 2:
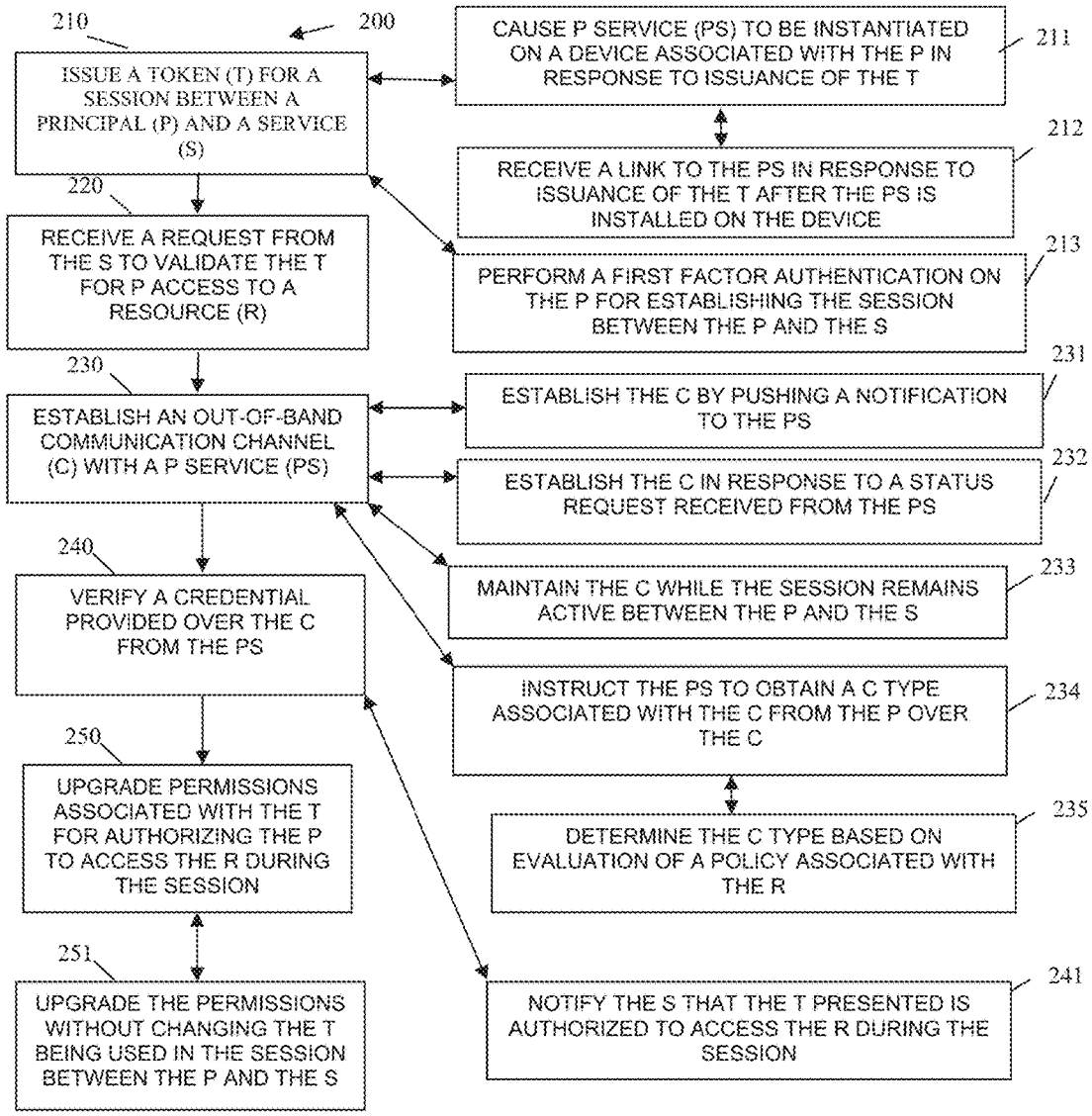
FIG. 2 is a diagram of another method for multi-factor authentication, according to an example embodiment.

FIG. 2 is a diagram of another method 200 for multi-factor authentication, according to an example embodiment. The method 200 is implemented as one or more software modules (herein after referred to as an "identity provider (IDP)"). The IDP is represented as executable instructions that are implemented, programmed, and resides within memory and/or a non-transitory machine-readable storage media; the executable instructions execute on one or more hardware processors of one or more network devices and have access to one or more network connections associated with one or more networks. The networks may be wired, wireless, or a combination of wired and wireless.

In an embodiment, IDP is the IDP 130.

In an embodiment, the IDP is the IDP discussed in any of the FIGS. 1A-1D.

In an embodiment, the device that executes the IDP is a server.

In an embodiment, the device that executes the IDP is a cloud processing environment.

In an embodiment, the device that executes the IDP is a proxy device.

At 210, the IDP issues a token for a session between a principal (operating a principal device) and a service. In an embodiment, the service is the external system 140, In an embodiment, the principal device is any of the user-operated devices discussed above with the FIGS. 1A-1D. The token is issued for the principal to establish an authenticated session with the service. The service using the IDP for authenticated access to the service and the principal initially requesting the session with the service (this was described in detail above with reference to the FIGS. 1A-1D).

According to an embodiment, at 211, the IDP causes a principal service (discussed below at 220) to be instantiated and executed on the principal device in response to issuance of the token. In an embodiment, the principal service is the authenticated session agent 111 and/or 121. In an embodiment, the principal service is the USL discussed above with the FIGS. 1B-1D.

In an embodiment, at 212, the IDP receives a link to the principal service in response to the IDP issuing the token and after the principal service is initiated on the principal device upon establishment of the session between the principal and the service.

In an embodiment, at 213, the IDP performs a first factor authentication on the principal for establishing the session between the principal and the service. For example, and identifier and password combination provided by the principal for authenticated to the service in the session.

At 220, the IDP receives a request from the service to validate the token for principal access to a resource. In an embodiment, the resource is the protected resource 141. The original issued token is insufficient for providing access to the resource. That is, the resource requires additional authentication beyond the initial authentication that the principal had to undergo for establishing the initial session with the service.

At 230, the IDP establishes an out-of-band communication channel with the principal service (such as the authentication session agent 111 and/or 112 or the USL discussed above in the FIGS. 1A-1D). The manner for establishing this out-of-band communication channel was discussed above in the FIGS. 1A-1D.

According to an embodiment, at 231, the IDP establishes the out-of-band communication channel by pushing a notification to the principal service (this is the first (push) mode of operation discussed above for the authentication session agent 111).

In an embodiment, at 232, the IDP establishes the out-of-band communication channel in response to a status request received from the principal service (this is the second (pull) mode of operation discussed above for the authentication session agent 111).

In an embodiment, at 233, the IDP maintains the out-of-band communication channel while and as long as the session remains active between the principal and the service, In an embodiment, at 234, the IDP instructs the principal service to obtain a credential type associated with the credential from the principal over the out-of-band communication channel. The credential type can be associated with a finger print, a different biometric reading, a USB device key, a PIN, etc.

In an embodiment of 234 and at 235, the IDP determines the credential type based on evaluation of a policy associated with the resource. That is, the IDP maintains a policy that based on an identity for the resource identifies a type of authentication that the IDP is to perform to grant access to the resource. The type of authentication corresponds to the credential type.

At 240, the IDP verifies a credential provided over the out-of-band communication channel from the principal service.

In an embodiment, at 241, the IDP notifies the service that the token presented is authorized to access the resource during the session. This is done without changing the original authentication token.

At 250, the IDP upgrades permissions associated with the token for purposes of authorizing the principal to access the resource during the session. Again, the existing originally issued token is not changed only access permissions are upgraded for that token.

In an embodiment, at 251, the IDP upgrades the permissions without changing the token being used in the session between the principal and the service.

Figure 3:
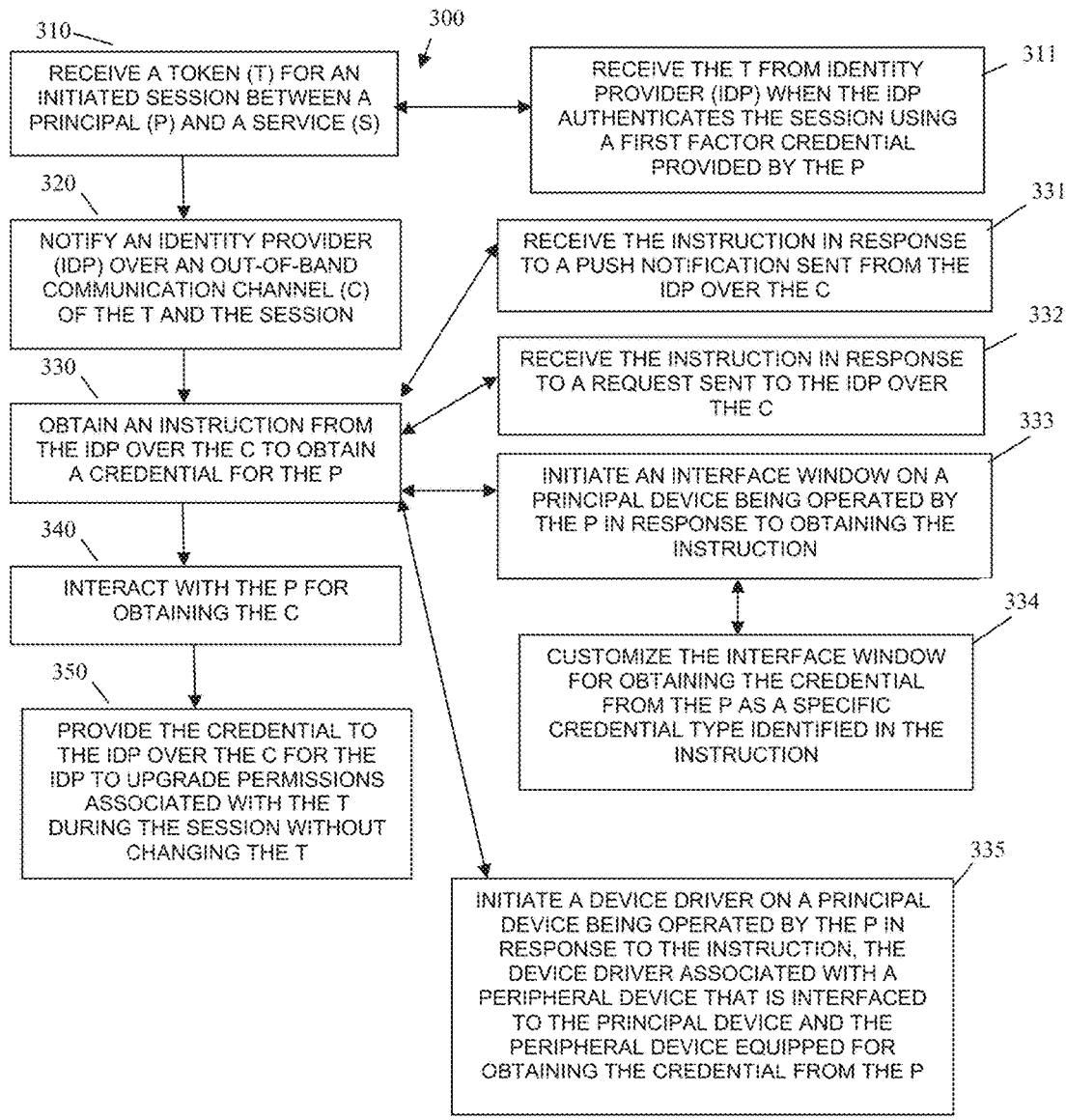
FIG. 3 is a diagram of yet another method for multi-factor authentication, according to an example embodiment.

FIG. 3 is a diagram of another method 300 for multi-factor authentication, according to an example embodiment, The method 300 is implemented as one or more software module(s) (herein after referred to as an "authentication session agent") on one or more hardware devices. The authentication session agent is represented as executable instructions that are implemented, programmed, and resides within memory and/or a non-transitory machine-readable storage medium; the executable instructions execute on one or more hardware processors of the one or more hardware devices and have access to one or more network connections associated with one or more networks, The networks may be wired, wireless, or a combination of wired and wireless.

In an embodiment, the authentication session agent is one or more of: the authentication agent 111, the USL (discussed in the FIGS, 1B-1D, and/or the principal service (discussed in the FIG. 2).

In an embodiment, the hardware device that executes the authentication session agent is one or more of: the user-operated device 111/121, the principal access device (discussed in the FIGS, 1B-1D), and/or the principal device (discussed in the FIG. 2).

At 310, the authentication session agent receives a token for an initiated session between a principal and a service.

In an embodiment, at 311, the authentication session agent receives the token from an IDP when the IDP authenticates the session using a first factor credential provided by the principal. In an embodiment, the IDP is one or more of: IDP 130, the IDP discussed in the FIGS. 1B-1D, and/or the IDP discussed above as the method 200.

At 320, the authentication session agent notifies the IDP over an out-of-band communication channel of the token and the session. This can be done in any of the manners discussed above in the FIGS, 1A-1D and the FIG. 2.

At 330, the authentication session agent obtains an instruction from the IDP over the out-of-band communication channel to obtain a credential for the principal. The credential is different from any credential provided by the principal to establish the initial session with the service. Moreover, the out-of-band communication channel is a different channel from that which is being used for the session between the principal and the service, According to an embodiment, at 331, the authentication session agent receives the instruction in response to a push notification (push mode of operation for the authentication session agent 111 discussed above in the FIG. 1A) sent from the IDP over the out-of-band communication channel.

In an embodiment, at 332, the authentication session agent receives the instruction in response to a request sent from the IDP over the out-of-band communication channel (pull mode of operation for the authentication session agent 111 discussed above in the FIG. 1A).

In an embodiment, at 333, the authentication session agent initiates an interface window on a principal device (same device that the authentication session agent is executing) being operated by the principal in response to obtaining the instruction from the IDP.

In an embodiment of 333 and at 334, the authentication session agent customizes the interface window for obtaining the credential from the principal as a specific credential type (discussed above in the FIG. 2), which was identified by the instruction received from the IDP.

In an embodiment, at 335, the authentication session agent initiates a device driver on a principal device being operated by the principal in response to receiving the instruction from the IDP. The device driver is associated with a peripheral device (biometric reading device, USB device, etc.) that is interfaced to the principal device and the principal device is equipped for obtaining the credential from the principal.

At 340, the authentication session agent interacts with the principal and/or a peripheral device of the principal for obtaining the credential.

At 350, the authentication session agent provides the credential to the IDP over the out-of-band communication channel for the IDP to upgrade permissions associated with the token during the ongoing session between the principal and the service. This upgrade by the IDP to the token is done without changing the token and as discussed above with the FIGS. 1A-1D and the FIG. 2.

Figure 4:
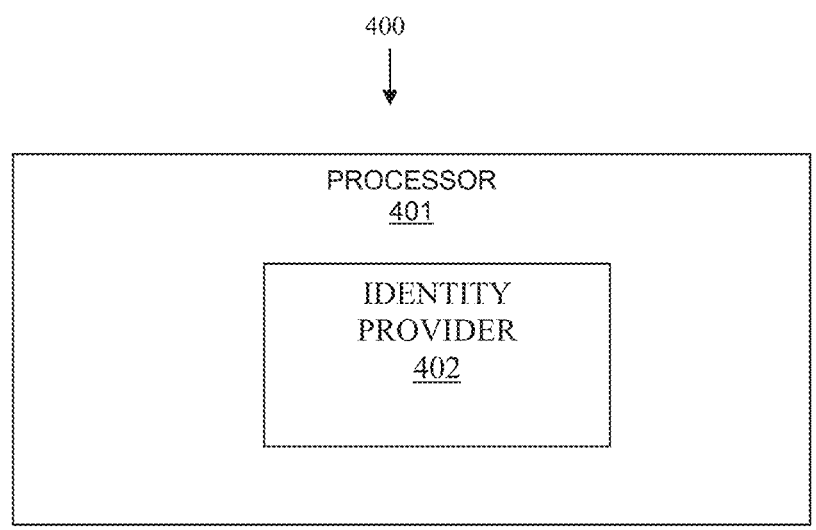
FIG. 4 is a diagram of a multi-factor authentication system, according to an embodiment.

FIG. 4 is a diagram of a multi-factor authentication system 400, according to an embodiment. Various components of the multi-factor authentication system 400 are software module(s) represented as executable instructions, which are programed and/or reside within memory and/or non-transitory computer-readable storage media for execution by one or more hardware devices. The components and the hardware devices have access to one or more network connections over one or more networks, which are wired, wireless, or a combination of wired and wireless.

In an embodiment, the multi-factor authentication system 400 implements, inter glia, the processing depicted in the FIGS. 1A-1D and the FIGS. 2-3. Accordingly, embodiments discussed above with respect to the FIGS. presented herein and above are incorporated by reference herein with the discussion of the multi-factor authentication system 400.

The multi-factor authentication system 400 includes a processor 401 and an IDP 402.

In an embodiment, the processor 401 is part of a server.

In an embodiment, the processor 401 is part of a cloud processing environment.

The IDP 402 is configured and adapted to: 1) execute on the processor 401, 2) provide a token to a principal and a service to establish a session with one another (between the principal and the service) using a first set of permissions, 3) utilize a back channel of communication to a principal service for obtaining a credential for the principal during the session, and 4) upgrade the first set of permissions to a second set of permissions for the session in response to successfully validating the credential provided over the back channel of communication.

In an embodiment, the IDP 402 is one or more of: the IDP 130, the IDP discussed in the FIGS. 1B-1D, and/or the IDP discussed as the method 200 of the FIG. 2.

In an embodiment, the principal service is one or more of: the authentication session agent 111/121, the USL (discussed in the FIGS. 1B-1D, the principal service discussed in the FIG. 2, and the method 300 discussed in the FIG. 3.

In an embodiment, the IDP 402 is further configured to: authenticate the principal and the service for establishing the session using a first factor authentication and authenticate the principal for the upgraded second set of permissions using a second factor authentication based on validation of the credential provided through the back channel of communication from the principal service.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
    issuing a token to a first device operated by a principal for a session between the principal and a service by providing the token as an authentication token for the session when the principal authenticates for access to the service and linking the token to session access rights for the session;
    obtaining a session key to access the session between the principal and the service, and obtaining a hook to a principal service of the first device;
    receiving a request from the service to validate the token for principal access to a resource of the service during the session and determining that the session access rights lacks permission to access the resource during the session, wherein the service is executed on a second device;
    establishing an out-of-band communication channel with the principal service of the first device using the hook;
    verifying a credential provided over the out-of-band communication channel from the principal service of the first device; and
    upgrading permissions associated with the session access rights linked to the token and authorizing the principal to access the resource on the second device during the session based on verifying the credential and by using the session key and without changing the token.

2. The method of claim 1, wherein issuing further includes causing the principal service to be instantiated on the first device associated with the principal in response to issuing the token.

3. The method of claim 2, wherein obtaining further includes receiving the hook as a link to the principal service in response to issuing the token after the principal service is instantiated on the first device and receiving the link from the principal service.

4. The method of claim 1, wherein issuing further includes performing a first factor authentication on the principal for establishing the session between the principal and the service.

5. The method of claim 1, wherein establishing further includes establishing the out-of-band communication channel by pushing a notification to the principal service using the hook.

6. The method of claim 1, wherein establishing further includes establishing the out-of-band communication channel in response to a status request received from the principal service.

7. The method of claim 1, wherein establishing further includes maintaining the out-of-band communication channel while the session remains active between the principal and the service.

8. The method of claim 1, wherein establishing further includes instructing the principal service to obtain a credential type associated with the credential from the principal over the out-of-band communication channel.

9. The method of claim 8, wherein instructing further includes determining the credential type based on evaluation of a policy associated with the resource.

10. The method of claim 1, wherein verifying further includes notifying the service that the token presented is authorized to access the resource during the session.

11. A method, comprising:
    receiving, on a principal device, a token as an authentication taken for an initiated session between a principal and a service that executes on a service device, wherein receiving further includes receiving the token from an identity provider device that executes an identity provider;
    notifying, by the principal device, the identity provider over an out-of-band communication Channel of the token and the session by providing the identity provider a session key for the session, the token, and a hook to interact with the method over the out-of-band communication channel;
    obtaining, by the principal device, an instruction from the identity provider over the out-of-band communication channel to obtain a credential from the principal during the session;
    interacting, by the principal device, with the principal for obtaining the credential; and
    providing, by the principal device, the credential to the identity provider over the out-of-band communication channel for the identity provider to upgrade existing permissions associated with the token during the session without changing the token based on verification of the credential by the identity provider that was processed over the out-of-band communication channel during the session.

12. The method of claim 11, wherein receiving further includes receiving the token from the identity provider when the identity provider authenticates the session using a first factor credential provided by the principal.

13. The method of claim 11, wherein obtaining further includes receiving the instruction in response to a push notification sent from the identity provider over the out-of-band communication channel.

14. The method of claim 11, wherein obtaining further includes receiving the instruction in response to a request sent to the identity provider over the out-of-band communication channel.

15. The method of claim 11, wherein obtaining further includes initiating an interface window on the principal device being operated by the principal in response to obtaining the instruction.

16. The method of claim 15, wherein initiating further includes customizing the interface window for obtaining the credential from the principal as a specific credential type identified in the instruction.

17. The method of claim 11, wherein obtaining further includes initiating a device driver on the principal device being operated by the principal in response to the instruction, wherein the device driver associated with a peripheral device that is interfaced to the principal device and the peripheral device is equipped for obtaining the credential from the principal.

18. A device, comprising:
a hardware processor; and
a non-transitory computer-readable storage medium including executable instructions executable by the hardware processor to:
provide a token as an authentication token for a principal that operates a principal device and a service that executes on a service device to establish a session with one another using a first set of permissions, wherein the token is linked to the first set of permissions;
obtain a session key for the session and obtain a hook to a principal service that executes on the principal device;
utilize a back channel of communication to the principal service using the hook to obtain a credential for the principal during the session when the principal attempts to access a resource during the session that the first set of permissions lack access rights to access for the session and
upgrade the first set of permissions to a second set of permissions for the session using the session key without changing the token for the session when the credential provided over the back channel is successfully validated.

19. The device of claim 18, wherein the non-transitory computer-readable storage medium further includes instructions executable by the hardware processor to:
authenticate the principal for the session as a first factor authentication and provide the token based on the first set of permissions; and
authenticate the principal for the upgraded second set of permissions as a second factor authentication based on validation of the credential over the back channel.

* * * * *